UNITED STATES PATENT OFFICE.

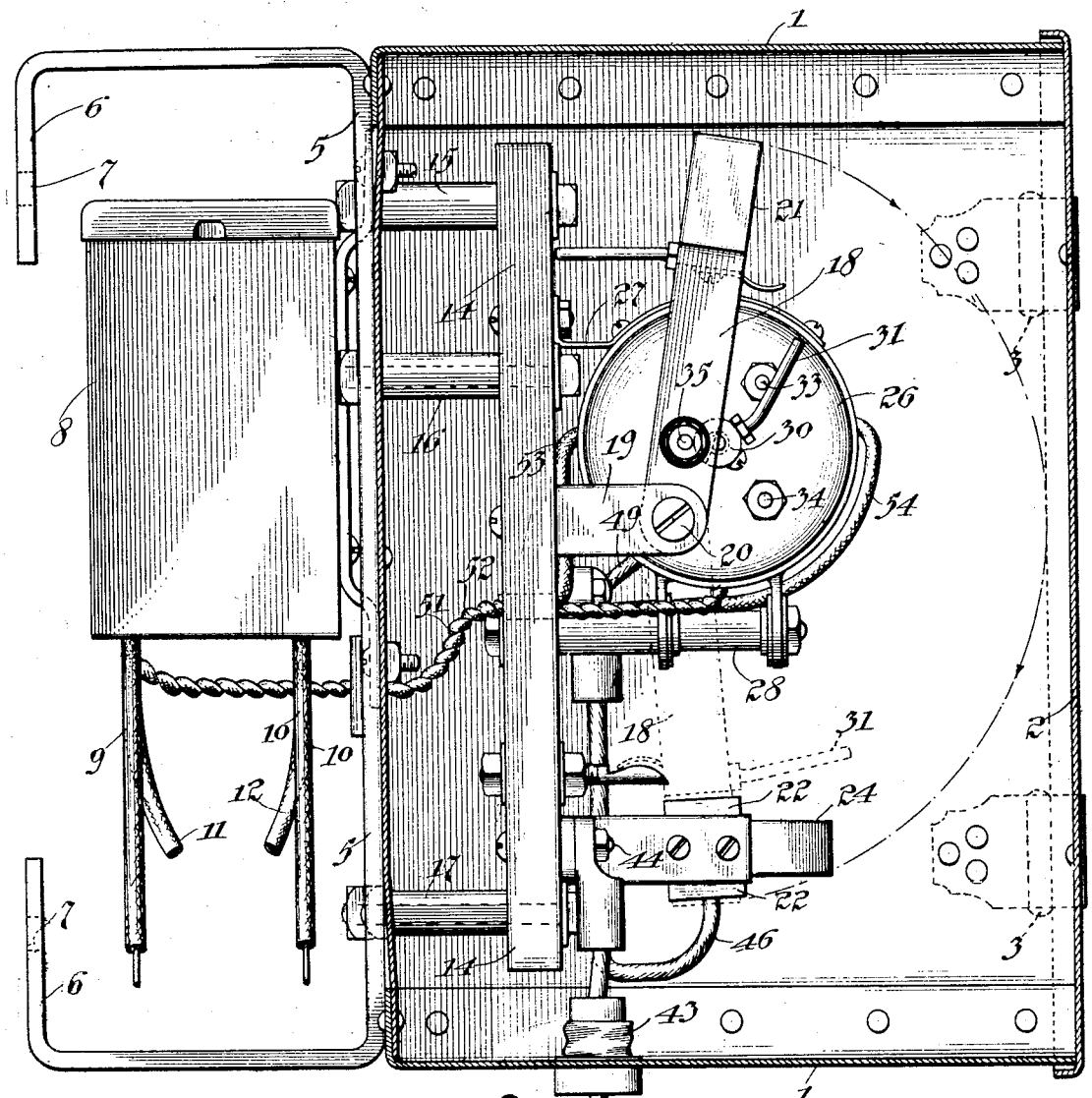

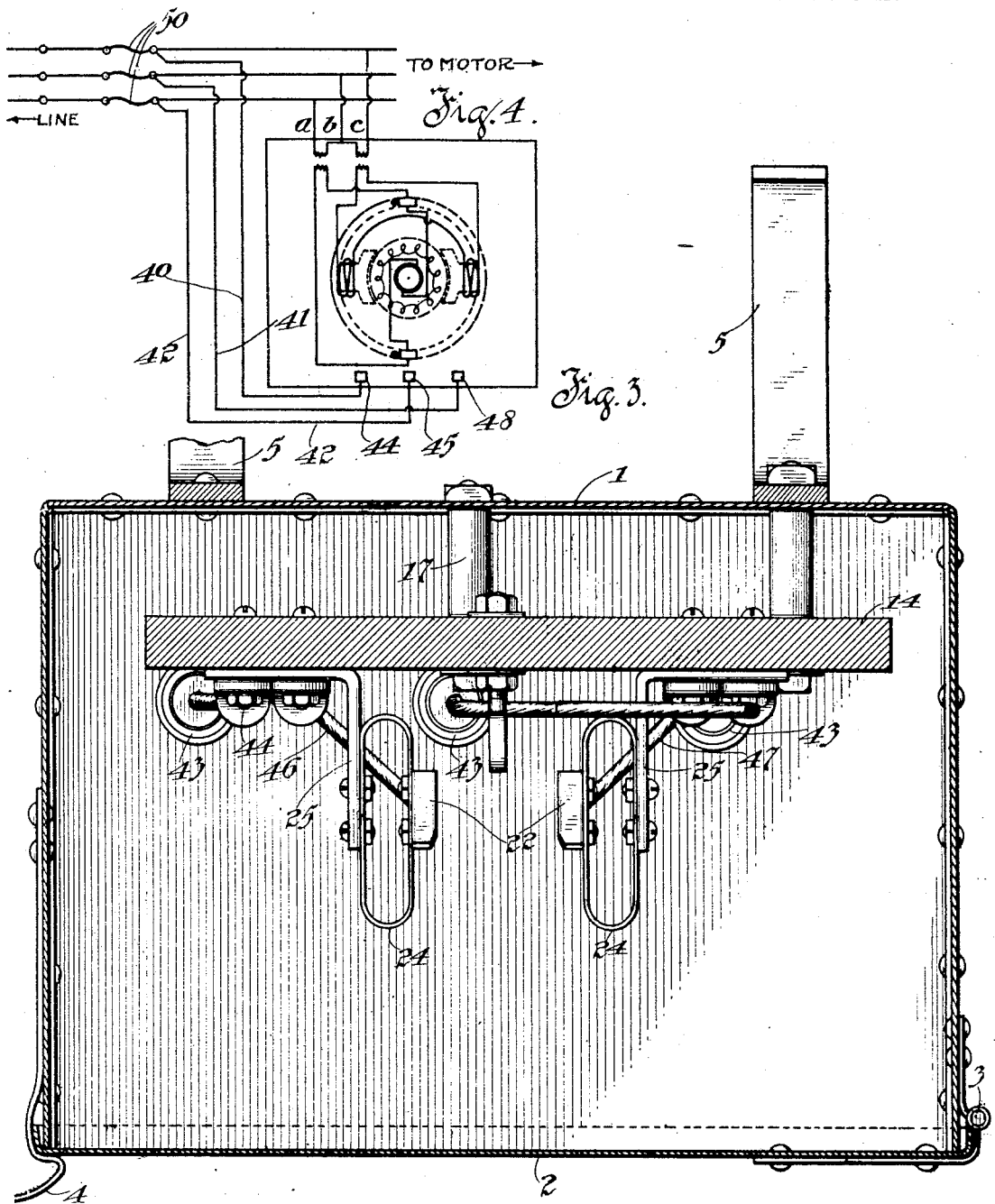

EDMUND O. SCHWEITZER, OF CHICAGO, ILLINOIS.

REVERSE-PHASE RELAY.

1,310,216.  Specification of Letters Patent.  Patented July 15, 1919.

Application filed November 3, 1913. Serial No. 798,857.

*To all whom it may concern:*

Be it known that I, EDMUND O. SCHWEITZER, a citizen of the United States, residing at Chicago, in the county of Cook and State of Illinois, have invented a certain new and useful Improvement in Reverse-Phase Relays, of which the following is a full, clear, concise, and exact description, reference being had to the accompanying drawings, forming a part of this specification.

My invention relates to devices for automatically protecting induction motors or other devices from improper connection or arrangement of the leads or line wires, or other abnormal operation of a polyphase system.

Prominent objects of the invention are to provide a simple, practical and efficient device of the kind specified; to reduce the cost of manufacture; to make the device reliable and accurate; to avoid the necessity of expert attention while the system is operating properly, but to require such expert attention from the central station after an operation of the device; and to secure the foregoing and other desirable results in a simple and practical manner.

In the accompanying drawings, Figure 1 is an elevation of a reverse phase relay embodying my invention, the cover of the same being partially broken away for convenience of illustration;

Fig. 2 is a vertical section taken on line 2—2 in Fig. 1;

Fig. 3 is a horizontal section taken on line 3—3 in Fig. 1;

Fig. 4 is a diagram illustrating the connections of the device with the circuit.

Fig. 5 is a view of a detail of construction.

Figure 1:
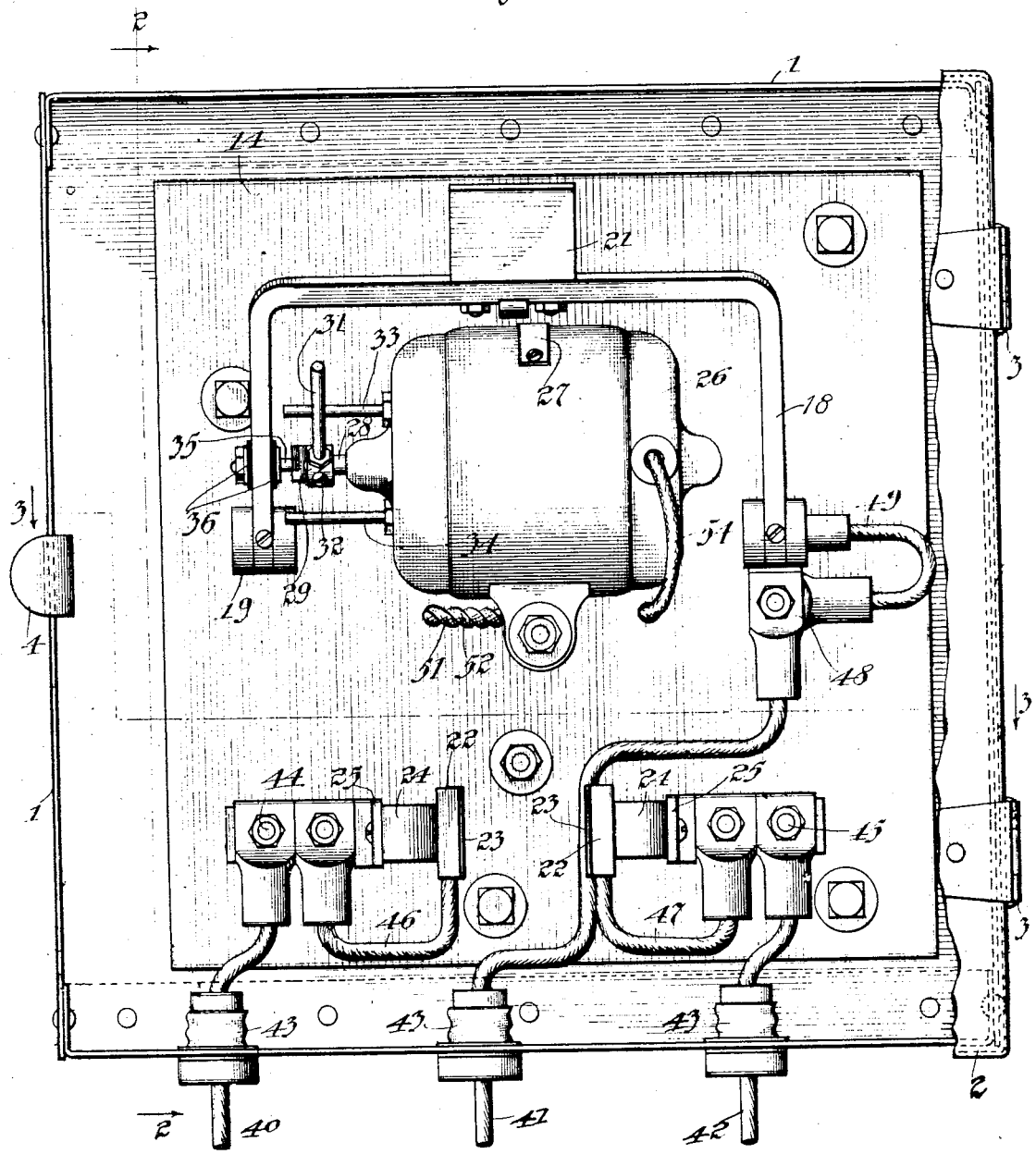

In the drawings I show a case 1 which may be of any suitable form but is conveniently made rectangular in shape. This is provided with a cover 2 hinged at 3, (Fig. 3), and held normally closed by a spring clasp or lock 4. The back of the case is conveniently provided with straps 5—5 having turn-down end portions 6—6, provided with apertures 7—7 by which the device can be attached to the wall or other supporting structure. Most of the operating mechanism is within the case 1, but as a convenient arrangement I provide on the back of the case a transformer box or arrangement 8 containing transformer coils, the use and connection of which will be more fully pointed out hereinafter. Wires or conductors 9, 10, 11 and 12 run to this transformer box 8, being extended thereto from the polyphase circuit under protection, as will be more fully hereinafter described.

Within the case 1 and upon the back wall thereof is mounted a vertically arranged support 14 which is preferably made of insulating material. This support or plate 14 is mounted upon the back wall of the case 1 by means of pillars or posts 15, 16 and 17. A switch device 18 is carried by the support 14, being conveniently pivotally supported upon posts 19—19 secured to said support 14, said switch 18 being pivotally connected at 20. The switch device 18 has two side legs running to the posts 19—19, and a projecting connecting portion 21 which may serve as a handle for the manipulation of the switch, but which also serves as a connecting member to make connection between separated contracts or terminals. The terminals with which the switch 18 operates are mounted upon the lower part of the support 14, and are shown at 22—22, said contacts being separated sufficiently to accommodate and make connection with the projection 21 of the switch 18. The contacts 22—22 are preferably faced as at 23 with graphite so as to prevent injurious effects from sparking and are as a matter of preference mounted upon loop spring members 24—24 carried by posts 25—25, secured to and projecting from the lower portion of the member 14, the spring members 24—24 giving the contacts or terminals 22—22 sufficient play or movement to accommodate the projection 21 on the switch 18 to permit making and breaking contact with said projection 21, and at the same time assuring a contact therewith, when said projection 21 is swung down and placed in between the contacts 22—22.

A motor 26 is also mounted upon the support 14 as by strips or posts 27—28 (Fig. 2). The motor 26 is preferably a 3-phase motor, and as shown especially in Fig. 1, is so mounted as to lie within or between the side arms of the switch 18. As a convenient and simple arrangement for accomplishing the function of the motor in the device the motor shaft 28 is provided with a cam device 29 best shown in detail in Fig. 5, which cam is in the form of a cylinder with a portion 30 cut away, said cam carrying a laterally or radially extending pin or bar 31. The cam device 29 is in the form of a loose collar and is provided with a set screw 32 by which the cam 29 can be more loosely or more tightly mounted upon the motor shaft 28. This mounting is a loose mounting so that the motor shaft may rotate without rotating the cam 29, but at the same time there is friction enough to cause the cam 29 to be turned by the shaft 28 if the former is perfectly free and unrestrained. Two pins 33 and 34 however, form stops to limit the movement of the cam 29 so that when said cam is turned in one direction or the other according to the direction of rotation of the motor shaft its movement is limited and it will be stopped by either the pin 33 or 34, and held in position against one or the other of said pins by the further rotation of the motor shaft. The pins 33 and 34 are conveniently secured to and extended over the motor frame. Another pin 35 is arranged to coöperate with the cam 29, said pin 35 being carried by one side of the switch 18 and insulated therefrom by insulating material 36. By this arrangement it will be seen that when the motor armature is rotated in a direction to cause the pin 31 to be swung upwardly, referring to Figs. 1 and 2, the projecting end of the cam 29 will come opposite the pin 35 on the switch 18, as shown in Figs. 2 and 5, so that the switch 18 will be held in an elevated position, as shown in Figs. 1 and 2. When, however, the direction of rotation of the motor armature is reversed the cam 29 will be turned so that the pin 31 will be swung downwardly and the cut-away portion 30 of said cam 29 will come opposite the pin 35 on the switch 18, whereby said switch will be permitted to drop and will fall or swing downwardly, the result of which will be that the projection 21 on said switch will go between the contacts 22—22, and make contact therewith, with the result in the operation of the instrument as will be hereinafter explained.

Leads 40, 41 and 42 are led through the bottom of the case 1, through insulators 43, the leads 40 and 42 being connected to terminals 44 and 45, respectively, which are in turn connected by conductors 46 and 47 with the contacts 22—22. The intermediate lead 41 is extended up to a terminal 48 which is in turn connected by a conductor 49 with one side of the switch 18. Thus it is apparent that when the switch 18 is in its elevated position as shown in Figs. 1 and 2, the leads 40, 41 and 42, are disconnected so far as the switch arrangement 18 is concerned, but that when said switch 18 is released by a reversal of the direction of rotation of the armature of the motor 26, and when said switch projection 21 closes connection between the contacts 22, 22, the leads 40 and 42 will be short circuited with the lead 41.

Referring now to the diagram, Fig. 4, it will be seen that when the leads 40, 41 and 42 are thus short circuited the circuit to which the device is applied is short circuited at or near the point where fuses 50 are located, so that when the circuit is thus short circuited the fuses 50, 50 will blow out and thereby open the circuit, and prevent any damage or injury to the apparatus on the circuit, such as a motor or other device.

Referring to the connection of the motor member 26 of the device, said motor is connected by means of field conductors 51 and 52, Figs. 1 and 2, and also by armature conductors 53, 54, with the transformers in the transformer case 8, it being understood that said case 8 is provided with a transformer for the armature and another for the fields. The transformers in the case 8 are connected in turn with the circuit leading to the motor or other device to be protected by means of the conductors 9, 10, and 11 running out of the transformer case 8.

Thus it will be seen that when the device is properly connected and when the phase relations are normal in the polyphase circuit, the motor 26 will be rotated so as to hold the pin 31 normally in an elevated position, thereby holding the switch 18 also in an elevated position and maintaining the circuit in normal condition. When, however, a phase is reversed, due to an improper re-connection, or to other cause, the direction of rotation of the motor armature will be reversed thereby permitting or causing the pin 31 to fall and also allowing the switch 18 to fall and thereby closing the circuit through the contacts 22, 22, and causing the fuses 50, 50 in the main circuit leading to the motor or other device under protection to blow and thereby opening said circuit and preventing damage or injury to said motor or other device. When the improper connection or other cause of trouble is removed the switch is elevated and the motor again elevates the pin 31, thereby holding the switch in elevated position and maintaining the circuit connections in normal condition.

It will be understood that changes and modifications can be made without departing from the spirit of the invention.

What I claim is:

1. A device of the class specified comprising a motor, a swinging switch having its arms on the outside of said motor and means between one of the arms of said switch and said motor for controlling the switch.

2. A device of the class specified comprising a motor, a swinging switch having its arms on the outside of said motor and means between one of the arms of said switch and said motor for controlling the switch, said means being adapted to hold the switch in an elevated position when the phase relations are normal, and being also adapted to release said switch when the phase relations are abnormal.

3. A device of the class specified comprising a motor, a swinging switch having its arms on the outside of said motor and means between one of the arms of said switch and said motor for controlling the switch, said means comprising a device carried by the end of the motor shaft and a coöperating device carried by said switch blade.

4. A device of the class specified comprising in combination, a rotary member, a pivotally mounted vertically swinging knife switch, a friction cam device rotating with said rotary member, and means on said switch coöperating with said cam device for holding said switch normally in an elevated position, but releasing the same to permit the switch to fall upon a reversal of the direction of rotation of said rotary member.

5. A device of the class specified comprising in combination, a rotary member, a pivotally mounted vertically swinging knife switch, a friction cam device rotating with said rotary member, and means on said switch coöperating with said cam device for holding said switch normally in an elevated position, but releasing the same to permit the switch to fall upon a reversal of the direction of rotation of said rotary member, and contacts with which said switch makes connection in its descended position.

6. The combination of a rotary member, a friction cam device mounted loosely upon the shaft of said rotary member, a stop holding said friction device against rotation, a switch, and a pin on said switch coöperating with said cam device to hold said switch in an elevated position and to release the same according to the direction of rotation of said member.

7. The combination of a rotary member having its shaft provided with a friction cam having a cut away portion, a pin projecting laterally from said cam, a stop for engaging said pin, a pivotally mounted switch, and a pin on said switch adapted to engage said cam when said pin thereon engages said stop, said switch pin being also adapted to move through the cut away portion of said cam when the direction of rotation of said member is reversed and said cam moves so as to swing its pin away from engagement with said stop.

8. The combination of a motor, a friction cam mounted upon the rotary member of said motor, a switch, and means whereby said switch is controlled by the friction cam on said rotary member.

9. The combination of a motor having its rotary member provided with a friction device, a switch, and means whereby said switch is controlled by said friction device.

10. The combination of a motor, a friction cam mounted upon the shaft of the rotary member of said motor, said cam having a cut away portion, a vertically swinging pivotally mounted switch, a pin on said switch adapted to engage said cam, and enter said cut away portion thereof when said cam is turned, a pin on said cam, a stop on the motor for engaging said pin, and contacts with which said switch engages when in a descended position.

11. A device of the class specified, comprising a case, an insulating support mounted upon but separated from one wall of said case, a switch pivotally mounted on said support, said switch having two separated pivotally mounted arms, a motor also mounted on said support and between the arms of said switch, and contacts below said motor for coöperating with said switch.

12. The combination with an insulating support, of a switch comprising two separated arms pivotally mounted upon said support, said switch also having a projection forming a contact, a motor mounted between the arms of said switch, devices by which the motor controls the switch, said devices being located between the motor and one of the arms of said switch, and contacts below the motor adapted to engage and make contact with said contact projection on said switch.

In witness whereof, I hereunto subscribe my name this 30th day of October, A. D. 1913.

EDMUND O. SCHWEITZER.

Witnesses:
A. LYDA JONES,
HAZEL ANN JONES.